US011533420B2

(12) United States Patent
Maruhashi et al.

(10) Patent No.: US 11,533,420 B2
(45) Date of Patent: Dec. 20, 2022

(54) SERVER, METHOD, NON-TRANSITORY COMPUTER-READABLE MEDIUM, AND SYSTEM

(71) Applicant: Sony Group Corporation, Tokyo (JP)

(72) Inventors: Yasuyuki Maruhashi, Kanagawa (JP); Kaoru Takada, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 15 days.

(21) Appl. No.: 16/637,221

(22) PCT Filed: Aug. 7, 2018

(86) PCT No.: PCT/JP2018/029585
§ 371 (c)(1),
(2) Date: Feb. 6, 2020

(87) PCT Pub. No.: WO2019/035391
PCT Pub. Date: Feb. 21, 2019

(65) Prior Publication Data
US 2020/0374450 A1    Nov. 26, 2020

(30) Foreign Application Priority Data
Aug. 17, 2017   (JP) .............................. JP2017-157453

(51) Int. Cl.
*H04N 5/232* (2006.01)
*G06T 7/00* (2017.01)
(Continued)

(52) U.S. Cl.
CPC ....... *H04N 5/23206* (2013.01); *G06T 7/0002* (2013.01); *G06V 20/56* (2022.01); *H04L 65/75* (2022.05); *H04L 67/125* (2013.01)

(58) Field of Classification Search
CPC .......... H04N 5/23206; H04N 21/2187; G06K 9/00791; G06T 7/0002; H04L 65/601; H04L 67/125
See application file for complete search history.

(56) References Cited

U.S. PATENT DOCUMENTS

2007/0286050 A1   12/2007 Araki
2013/0259441 A1*  10/2013 Horita ................ H04N 21/4223
                                                386/224
(Continued)

FOREIGN PATENT DOCUMENTS

JP      2000341688 A    12/2000
JP      2005-117339 A    4/2005
(Continued)

OTHER PUBLICATIONS

Japanese Notice of Allowance dated Jun. 1, 2021 for corresponding Japanese Application No. 2016-099955.

*Primary Examiner* — Girumsew Wendmagegn
(74) *Attorney, Agent, or Firm* — Michael Best & Friedrich LLP

(57) ABSTRACT

The present disclosure includes a server apparatus, a recording method, a non-transitory computer-readable, and a system. In one example, the server apparatus includes a recording unit and a controller. The controller is configured to receive image data of a subject from a camera, control the recording unit to record the image data of the subject that is received from the camera, monitor the image data of the subject to determine whether the image data of the subject that is received from the camera is abnormal, and responsive to determining that the image data of the subject that is received from the camera is abnormal, control the recording unit to perform recording end processing on the image data of the subject that has already been recorded.

20 Claims, 13 Drawing Sheets

(51) Int. Cl.
  *H04L 67/125* (2022.01)
  *G06V 20/56* (2022.01)
  *H04L 65/75* (2022.01)

(56) References Cited

U.S. PATENT DOCUMENTS

2014/0372798 A1   12/2014  Chang
2016/0275694 A1*  9/2016  Nomura ............... H04N 13/204
2016/0372157 A1* 12/2016  Funagi ..................... H04N 5/91
2018/0167662 A1*  6/2018  Mahadevan ....... H04N 21/4334

FOREIGN PATENT DOCUMENTS

| | | |
|---|---|---|
| JP | 2010088005 A | 4/2010 |
| JP | 2013229860 A | 11/2013 |
| JP | 2017011417 A | 1/2017 |

* cited by examiner

SERVER, METHOD, NON-TRANSITORY COMPUTER-READABLE MEDIUM, AND SYSTEM

TECHNICAL FIELD

The present technology relates to a server apparatus, a recording method, a program, and an information processing apparatus, and more particularly to a server apparatus, a recording method, a program, and an information processing apparatus by which already obtained data can be correctly recorded even if any error occurs in recording.

CROSS REFERENCE TO RELATED APPLICATIONS

This application claims the benefit of Japanese Priority Patent Application JP 2017-157453 filed Aug. 17, 2017, the entire contents of which are incorporated herein by reference.

BACKGROUND ART

In related art, if any error occurs while a camera is recording moving-images in an internal recording area of the camera main body, the recording may be terminated without normal end processing. In this case, already recorded moving-image data may be data that cannot be recognized and reproduced.

By the way, in recent years, a system in which a camera records moving-images in a recording area separated from the camera main body, such as a cloud server, via a network is known.

Patent Literature 1 has disclosed a technology in which a server checks recorded data of images picked up by a surveillance camera, and determines that the data is not recorded if the file size is not changed for a certain period of time, and notifies a manager of that abnormality.

CITATION LIST

Patent Literature

[PTL 1]
Japanese Patent Application Laid-open No. 2005-117339

SUMMARY OF INVENTION

Technical Problem

However, also with the configuration of Patent Literature 1, if any error occurs and recording is terminated without normal end processing, recorded already obtained data may be data that cannot be recognized and reproduced.

The present technology has been made in view of the above-mentioned circumstances to make it possible to correctly record already obtained data even if any error occurs in recording.

Solution to Problem

In one exemplary embodiment, the present disclosure includes a server. The server includes a recording unit and a controller. The controller is configured to receive image data of a subject from a camera, control the recording unit to record the image data of the subject that is received from the camera, monitor the image data of the subject to determine whether the image data of the subject that is received from the camera is abnormal, and responsive to determining that the image data of the subject that is received from the camera is abnormal, control the recording unit to perform recording end processing on the image data of the subject that has already been recorded.

In the above exemplary embodiment, to monitor the image data of the subject to determine whether the image data of the subject that is received from the camera is abnormal, the controller is further configured to detect whether the image data of the subject is received within a predetermined period of time, and determine that the image data of the subject is abnormal when the image data of the subject is not received within the predetermined period of time.

In another exemplary embodiment, the present disclosure includes a method. The method includes receiving, with a controller of a server, image data of a subject from a camera. The method includes controlling, with the controller, a recording unit to record the image data of the subject that is received from the camera. The method includes monitoring, with the controller, the image data of the subject to determine whether the image data of the subject that is received from the camera is abnormal. The method also includes controlling, with the controller, the recording unit to perform recording end processing on the image data of the subject that has already been recorded in response to determining that the image data of the subject that is received from the camera is abnormal.

In the above exemplary embodiment, monitoring the image data of the subject to determine whether the image data of the subject that is received from the camera is abnormal further includes detecting whether the image data of the subject is received within a predetermined period of time, and determining that the image data of the subject is abnormal when the image data of the subject is not received within the predetermined period of time.

In another exemplary embodiment, the present disclosure includes a non-transitory computer-readable medium comprising instructions that, when executed by an electronic processor of a server, cause the electronic processor to perform a set of operations. The set of operations includes receiving image data of a subject from a camera. The set of operations includes controlling a recording unit to record the image data of the subject that is received from the camera. The set of operations includes monitoring the image data of the subject to determine whether the image data of the subject that is received from the camera is abnormal. The set of operations also includes controlling the recording unit to perform recording end processing on the image data of the subject that has already been recorded in response to determining that the image data of the subject that is received from the camera is abnormal.

In yet another exemplary embodiment, the present disclosure includes a system. The system includes a camera and a server. The camera is configured to generate image data of a subject. The server includes a recording unit and a controller. The controller is configured to receive the image data of the subject from the camera, control the recording unit to record the image data of the subject that is received from the camera, monitor the image data of the subject to determine whether the image data of the subject that is received from the camera is abnormal, and responsive to determining that the image data of the subject that is received from the camera is abnormal, control the recording unit to perform recording end processing on the image data of the subject that has already been recorded.

In the above exemplary embodiment, the system further includes a vehicle including a vehicle control system, the vehicle control system including the camera.

It should be noted that the effects described here are not necessarily limitative and any effect described in the present disclosure may be provided.

DESCRIPTION OF EMBODIMENTS

Hereinafter, an embodiment for carrying out the present disclosure (hereinafter, referred to as embodiment) will be described. It should be noted that descriptions will be given in the following order.
1. Configuration of Camera System
2. Data Recording Processing by Server
3. Modified Example
4. Configuration of Recording System
5. Application Example 1. Configuration of Camera System (Outline of Camera System)

Figure 1:
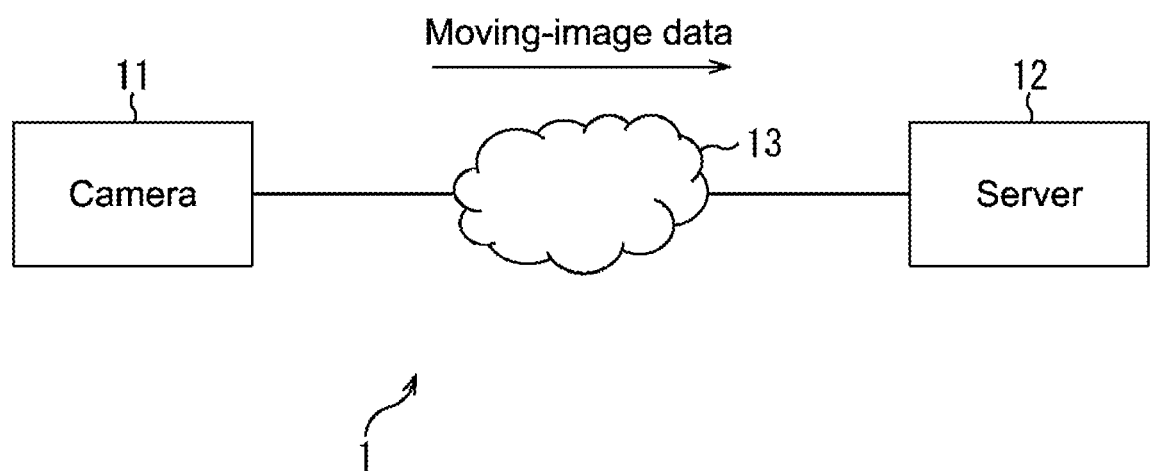
FIG. 1 is a diagram showing the outline of a camera system according to this embodiment.

FIG. 1 is a diagram showing the outline of a camera system according to this embodiment.

In a camera system 1 of FIG. 1, a camera 11 transmits data of picked up moving-images (moving-image data) to a server 12 via a network 13 such as the Internet in real time. The camera 11 does not record the moving-image data in its own apparatus.

The server 12 receives the moving-image data transmitted from the camera 11, and records the received moving-image data in real time.

That is, the camera system 1 realizes cloud storage that uploads the moving-images picked up by the camera 11 to the server 12.

Note that the camera 11 and the network 13 may be wiredly connected to each other or may be wirelessly connected to each other.

As will be described in detail later, the server 12 monitors a reception state of the moving-image data transmitted from the camera 11 via the network 13.

(Configuration Example of Server)

Figure 2:
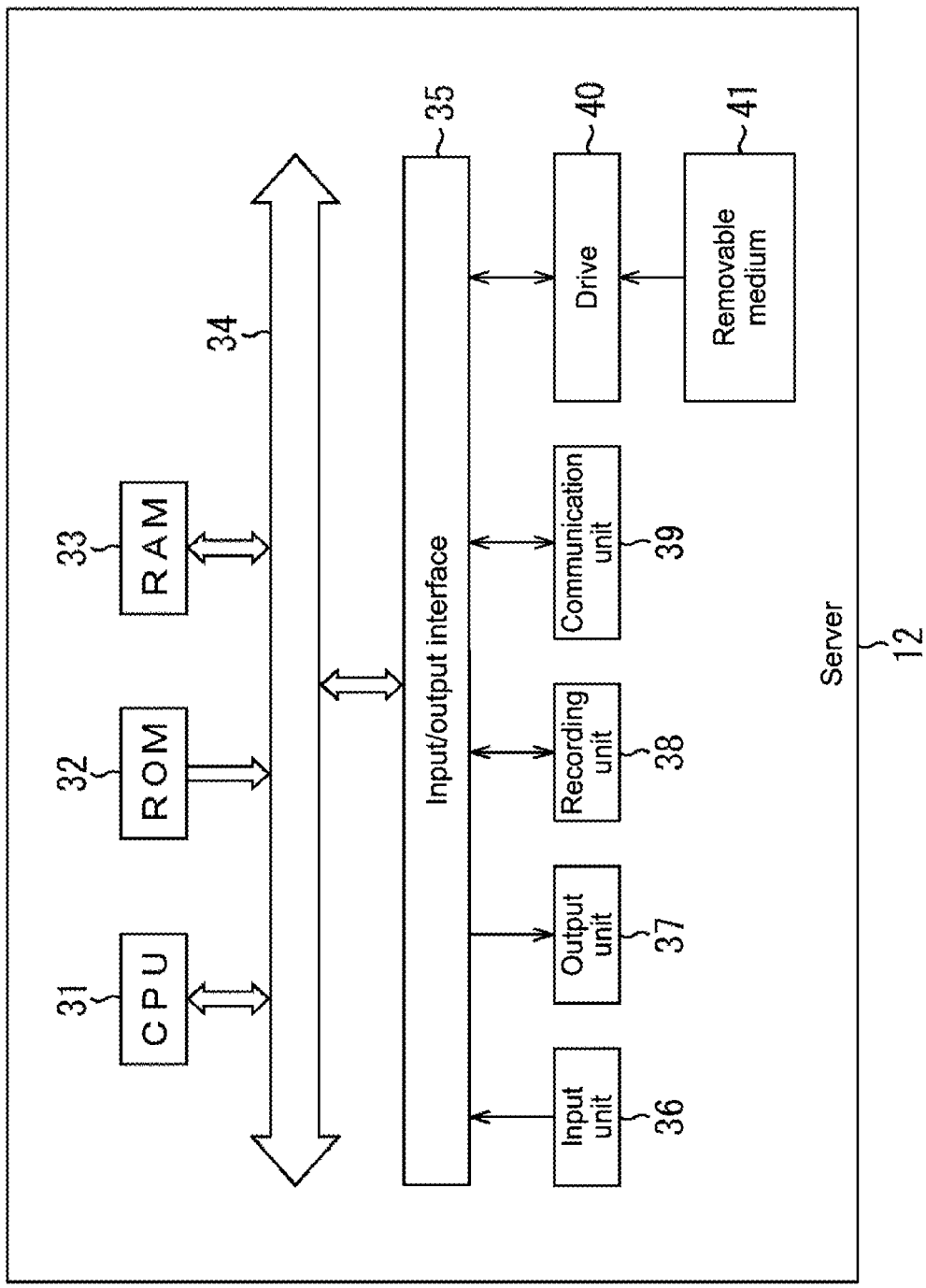
FIG. 2 is a block diagram showing a configuration example of a server.

FIG. 2 is a block diagram showing a configuration example of the server 12.

In the server 12 of FIG. 2, a central processing unit (CPU) 31 executes processing for realizing various functions of the server 12 in accordance with programs stored in a read only memory (ROM) 32 or programs loaded into a random access memory (RAM) 33. Data and the like necessary for the CPU 31 to execute various types of processing are further stored in the RAM 33 as appropriate.

The CPU 31, the ROM 32, and the RAM 33 are connected to one another via a bus 34. An input/output interface 35 is also connected to the bus 34.

An input unit 36, an output unit 37, a recording unit 38, and a communication unit 39 are connected to the input/output interface 35.

The input unit 36 includes a key, a button, a touch panel, a microphone, and the like. The output unit 37 includes a display, a speaker, and the like. The recording unit 38 includes a hard disk and the like. The communication unit 39 includes a communication module that performs wired communication and the like.

A drive 40 is further connected to the input/output interface 35 in a manner that depends on needs. A removable medium 41 is mounted on the drive 40 as appropriate. The removable medium 41 includes a nonvolatile semiconductor memory and the like. A computer program read from the removable medium 41 is installed into the recording unit 38 in a manner that depends on needs.

Functional Configuration Examples of Camera and Server

Figure 3:
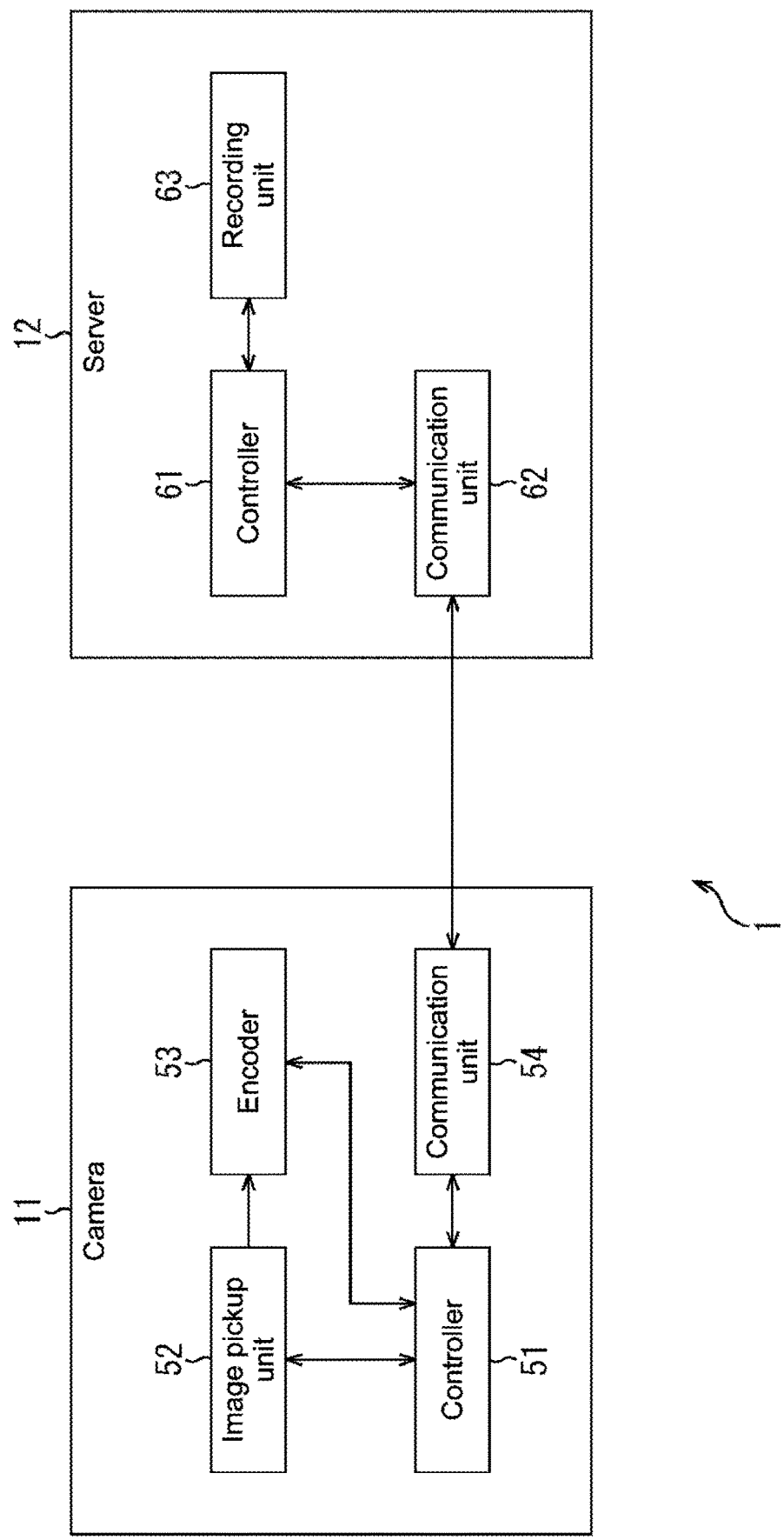
FIG. 3 is a block diagram showing functional configuration examples of a camera and the server.

FIG. 3 is a block diagram showing functional configuration examples the camera 11 and the server 12 of the camera system 1.

The camera 11 of FIG. 3 includes a controller 51, an image pickup unit 52, an encoder 53, and a communication unit 54.

The controller 51 controls respective sections of the camera 11. Specifically, the controller 51 controls image pickup by the image pickup unit 52 and controls communication by the communication unit 54.

The image pickup unit 52 captures images of an object. Specifically, the image pickup unit 52 picks up moving-images. The encoder 53 encodes the moving-image data, which is obtained by the image pickup unit 52, to generate moving-image data including a plurality of frames. The moving-image data generated by the encoder 53 is supplied to the communication unit 54 by the controller 51.

The communication unit 54 communicates with the server 12 under the control of the controller 51. The communication unit 54 transmits the moving-image data generated by the encoder 53 to the server 12.

On the other hand, the server 12 includes a controller 61, a communication unit 62, and a recording unit 63.

The controller 61 controls respective sections of the server 12. Specifically, the controller 61 controls communication by the communication unit 62 and controls recording in the recording unit 63.

The communication unit 62 communicates with the camera 11 under the control of the controller 61. The communication unit 62 receives the moving-image data transmitted from the camera 11.

Under the control of the controller 61, the moving-image data received by the communication unit 62 is recorded in the recorder 63.

Functional Configuration Examples of Controller

Next, functional configuration examples of the controller 61 of the server 12 will be described with reference to FIG. 4.

Figure 4:
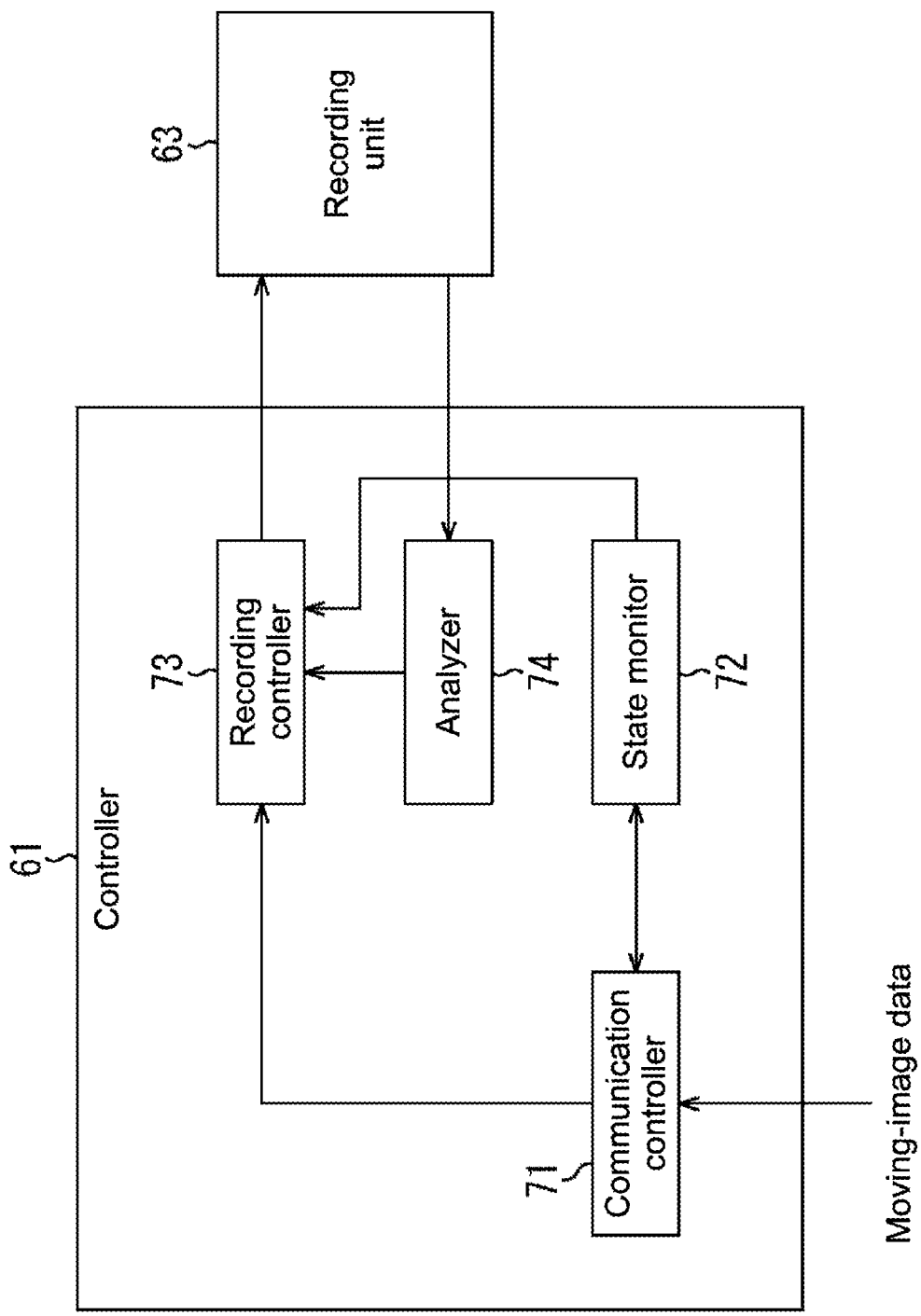
FIG. 4 is a block diagram showing functional configuration examples of a controller.

The controller 61 of FIG. 4 includes a communication controller 71, a state monitor 72, a recording controller 73, and an analyzer 74.

The communication controller 71 controls communication with the camera 11 by the communication unit 62 (FIG. 3), to thereby transmit and receive information to/from the camera 11. Specifically, the communication controller 71 receives various commands and the moving-image data which are transmitted from the camera 11 via the network 13.

The state monitor 72 monitors a reception state of the moving-image data at the communication controller 71. If the state monitor 72 detects that the reception state of the moving-image data is abnormal, the state monitor 72 notifies the recording controller 73 of that fact.

The recording controller 73 controls recording of the moving-image data in the recording unit 63. Further, if the recording controller 73 is notified by the state monitor 72 of the fact that the state monitor 72 detects that the reception state of the moving-image data is abnormal, the recording controller 73 performs recording end processing of normally terminating the recording of the moving-image data on a basis of a result of analysis of the moving-image data by the analyzer 74, which will be described later. The recording end processing refers to, for example, processing of completing the information in the file format of the moving-image data by, for example, adding footer information to a footer portion of the moving-image data in accordance with that format such that the moving-image data can be reproduced.

With this, the moving-image data obtained before the state monitor 72 detects that the reception state of the moving-image data is abnormal is normally recorded.

The analyzer 74 analyzes the moving-image data recorded in the recording unit 63, and supplies a result of analysis to the recording controller 73.

For example, the analyzer 74 analyzes the file format of the moving-image data recorded in the recording unit 63 in order for the recording controller 73 to perform the recording end processing. In this case, the recording controller 73 performs the recording end processing by adding, for example, the footer information to the footer portion of the moving-image data in accordance with the file format of which the recording controller 73 is notified by the analyzer 74.

2. Data Recording Processing by Server

Here, data recording processing by the server 12 will be described with reference to the flowchart of FIG. 5.

In Step S11, the communication controller 71 determines whether or not the communication unit 62 receives a recording start command transmitted from the camera 11.

Until the communication controller 71 determines that the communication unit 62 receives the recording start command, the processing of Step S11 is repeated. If the communication controller 71 determines that the communication unit 62 receives the recording start command, the communication controller 71 supplies the recording start command received by the communication unit 62 to the recording controller 73, and the processing proceeds to Step S12.

At this time, the communication controller 71 controls the communication unit 62, starts receiving the moving-image data transmitted from the camera 11, following the recording start command, and supplies the received moving-image data to the recording controller 73.

In Step S12, the recording controller 73 starts the recording of the moving-image data, which is transmitted from the camera 11, in the recording unit 63 on a basis of the recording start command supplied from the communication controller 71.

When the recording controller 73 starts the recording of the moving-image data, the state monitor 72 monitors the reception state of the moving-image data at the communication controller 71 in Step S13.

In Step S14, the state monitor 72 determines whether or not the state monitor 72 detects that the reception state of the moving-image data is abnormal.

For example, the state monitor 72 determines that the state monitor 72 detects that the reception state of the moving-image data is abnormal if the moving-image data is not received from the camera 11 within a predetermined period of time.

Alternatively, the state monitor 72 may detect that the reception state of the moving-image data is abnormal on a basis of information indicating an operation state of the camera 11, which is transmitted from the camera 11 at certain time intervals. For example, the state monitor 72 determines that the reception state of the moving-image data is normal while information indicating that the camera 11 is executing a recording operation is received. Further, the state monitor 72 detects that the reception state of the moving-image data is abnormal while information indicating that the camera 11 is executing an operation other than the recording operation is received.

Alternatively, the state monitor 72 may detect that the reception state of the moving-image data is abnormal on a basis of error information transmitted from the camera 11 if the controller 51 of the camera 11 detects any abnormality in the camera 11. Alternatively, the state monitor 72 may detect that the reception state of the moving-image data is abnormal on a basis of a state of connection with the camera 11 via the network 13.

Alternatively, the state monitor 72 may detect that the reception state of the moving-image data is abnormal by combining the above-mentioned detection methods.

In Step S14, if the state monitor 72 does not detect that the reception state of the moving-image data is abnormal, the processing proceeds to Step S15, and the communication controller 71 determines whether or not the communication unit 62 receives a recording end command transmitted from the camera 11.

Until the communication controller 71 determines that the communication unit 62 receives the recording end command, the processing of Steps S13 to S15 is repeated. Then, the communication controller 71 determines that the communication unit 62 receives the recording end command, the communication controller 71 supplies the recording end command received by the communication unit 62 to the recording controller 73, and the processing proceeds to Step S16.

In Step S16, the recording controller 73 performs the recording end processing of the moving-image data transmitted from the camera 11 on a basis of the recording end command supplied from the communication controller 71.

On the other hand, if the state monitor 72 detects that the reception state of the moving-image data is abnormal in Step S14, the processing proceeds to Step S17.

In Step S17, the analyzer 74 analyzes the moving-image data already recorded in the recording unit 63, and supplies a result of analysis to the recording controller 73.

Then, in Step S18, the recording controller 73 performs the recording end processing on a basis of the result of analysis (e.g., information indicating the file format) supplied from the analyzer 74.

In accordance with the above-mentioned processing, even if any error occurs in recording the moving-image data, the already obtained data can be correctly recorded. Therefore, it is possible to prevent an important captured picture from becoming data that cannot be recognized and reproduced.

3. Modified Example

Hereinafter, a modified example of the above-mentioned embodiment will be described.

Another Example of Data Recording Processing

Figure 5:
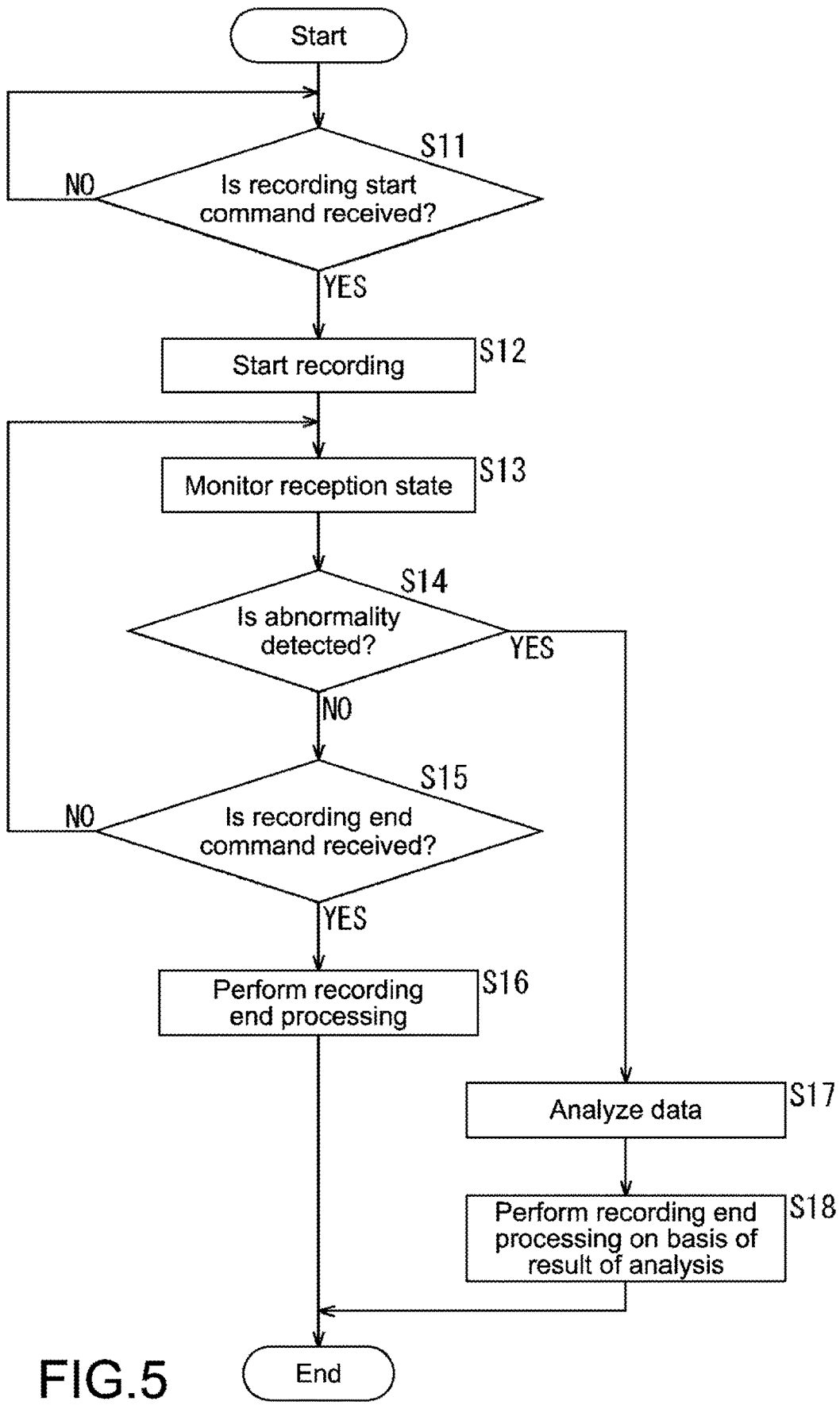
FIG. 5 is a flowchart for describing data recording processing.

In the processing of FIG. 5, the moving-image data already recorded in the recording unit 63 is analyzed after the abnormality of the reception state of the moving-image data is detected. In this case, it may take a long time to detect the abnormality and complete the analysis of the moving-image data. As a result, it may also take a long time to perform the recording end processing.

Figure 6:
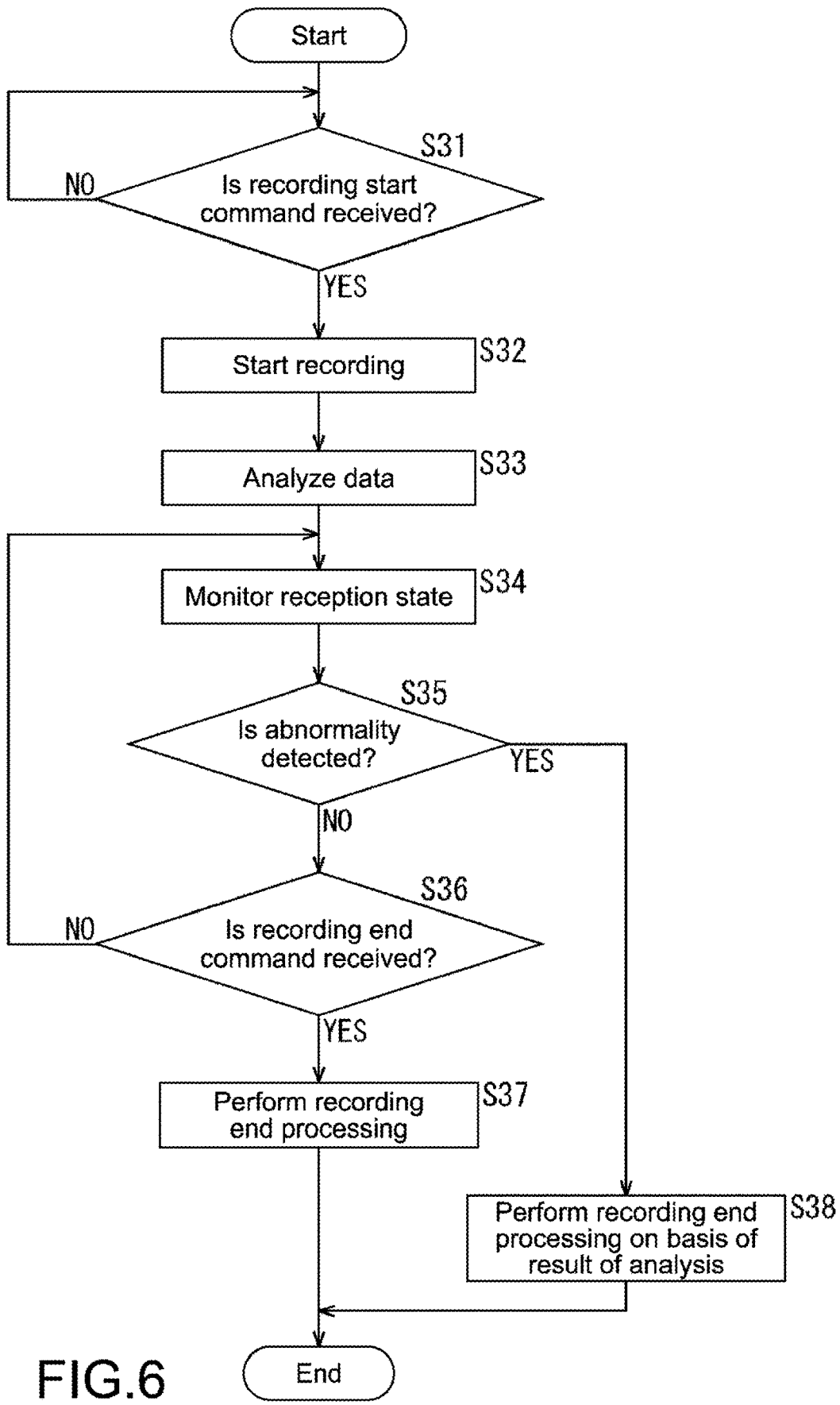
FIG. 6 is a flowchart for describing the data recording processing.

In view of this, as shown in the flowchart of FIG. 6, the moving-image data recorded in the recording unit 63 may be analyzed in parallel with the recording of the moving-image data in the recording unit 63.

In the flowchart of FIG. 6, in Step S32, the recording unit 63 starts the recording of the moving-image data received from the camera 11. After that, in Step S33, the analyzer 74 successively analyzes the moving-image data recorded in the recording unit 63, and supplies results of analysis to the recording controller 73.

Further, if the state monitor 72 detects that the reception state of the moving-image data is abnormal in Step S35, the processing proceeds to Step S38, and the recording controller 73 performs the recording end processing on a basis of the result(s) of analysis obtained before the state monitor 72 detects that the reception state of the moving-image data is abnormal.

With this, the time from the abnormality detection to the analysis completion of the moving-image data can be reduced. Thus, it does not take a long time to perform the recording end processing.

Other Functional Configuration Examples of Camera and Server

Figure 7:
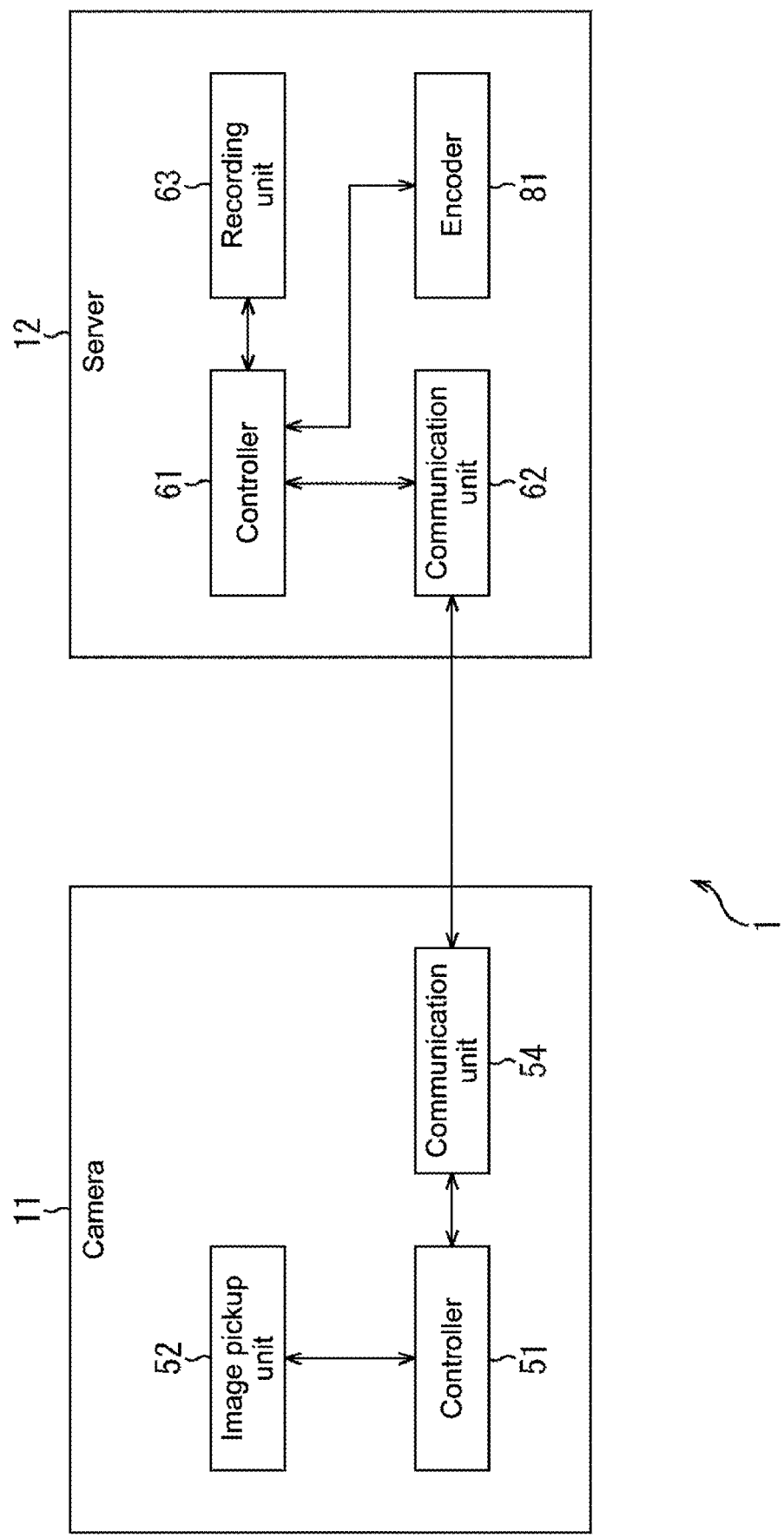
FIG. 7 is a block diagram showing other functional configuration examples of the camera and the server.

FIG. 7 is a block diagram showing other functional configuration examples of the camera 11 and the server 12 of the camera system 1.

The camera system 1 of FIG. 7 is different from the camera system 1 of FIG. 1 in that the camera 11 does not include the encoder 53 and that the server 12 includes an encoder 81.

In this case, the communication unit 54 of the camera 11 transmits raw moving-image data (RAW data) obtained by the image pickup unit 52 to the server 12. Further, the communication unit 54 of the camera 11 also transmits information necessary to encode the RAW data to the server 12.

Further, the encoder 81 of the server 12 encodes the RAW data by using the information received from the camera 11 to generate moving-image data including a plurality of frames. The moving-image data generated by the encoder 81 is recorded in the recording unit 63 by the recording controller 73 of the controller 61.

Also with such a configuration, even if any error occurs in recording the moving-image data, the already obtained data can be correctly recorded.

Other Functional Configuration Examples of Controller

Figure 8:
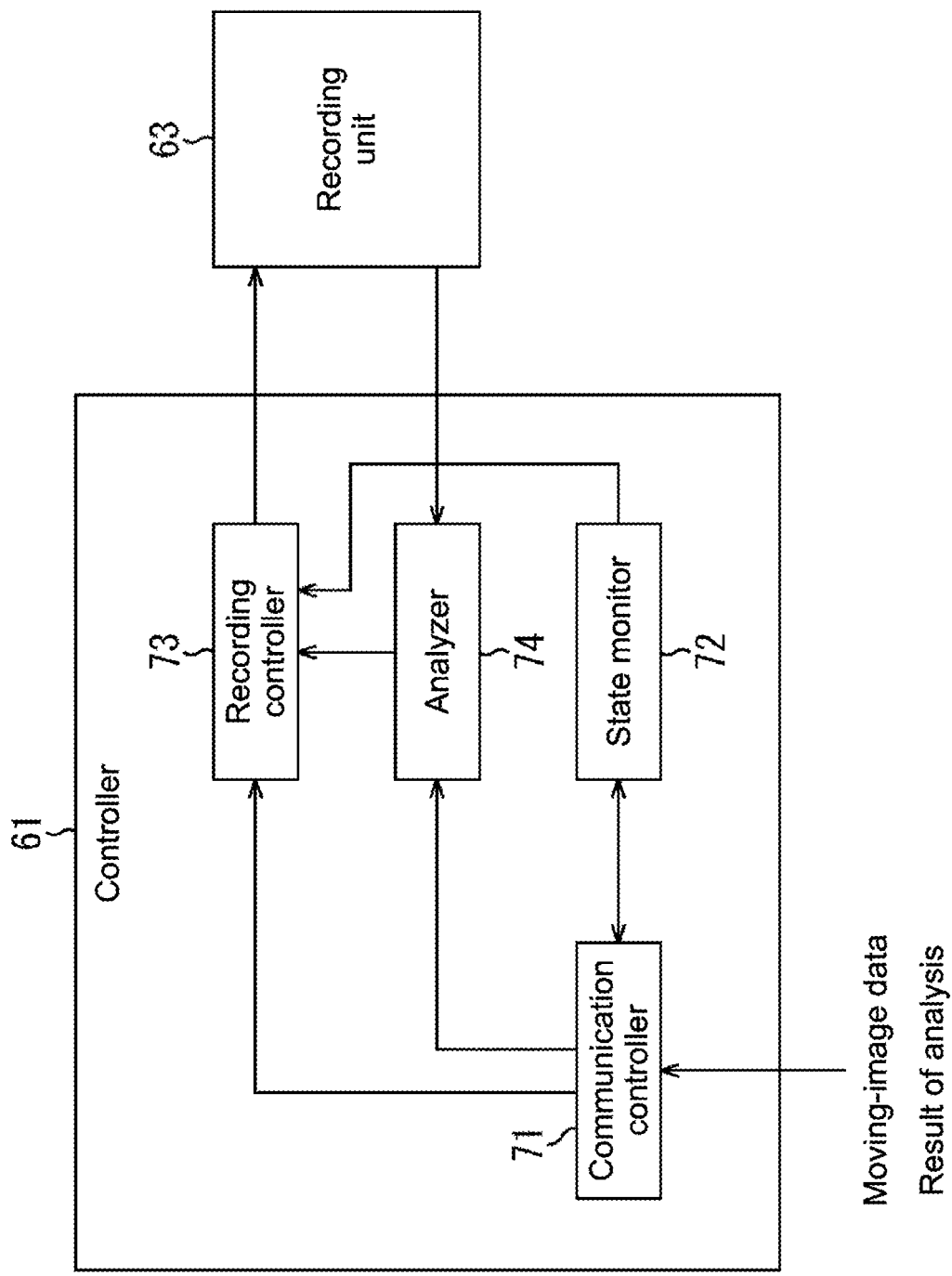
FIG. 8 is a block diagram showing other functional configuration examples of the controller.

FIG. 8 is a block diagram showing other functional configuration examples of the controller 61 of the server 12.

In the example of FIG. 8, it is assumed that, under the control of the controller 51, the camera 11 transmits the moving-image data to the server 12, analyzes the moving-image data, and transmits a result of analysis to the server 12 at certain time intervals.

In this case, the communication controller 71 receives the moving-image data transmitted from the camera 11 via the network 13, and receives the result of analysis of the moving-image data transmitted from the camera 11 via the network 13 at certain time intervals.

If the state monitor 72 detects that the reception state of the moving-image data is abnormal, the analyzer 74 analyzes the moving-image data on a basis of the result of analysis of the moving-image data, which is transmitted from the camera 11 at certain time intervals.

At this time, the analyzer 74 only needs to analyze moving-image data subsequent to the analysis target indicated by the result of analysis transmitted from the camera 11. With this, the time from the abnormality detection to the analysis completion of the moving-image data can be reduced.

Still Other Example of Data Recording Processing

In the above-mentioned data recording processing, if any error occurs in recording, the recording end processing is performed while the recording of the moving-image data is not completed. Therefore, the file of the moving-image data is unintentionally divided.

In view of this, data recording processing that prevents the file of the moving-image data from being unintentionally divided will be described with reference to the flowcharts of FIGS. 9 and 10.

Figure 9:
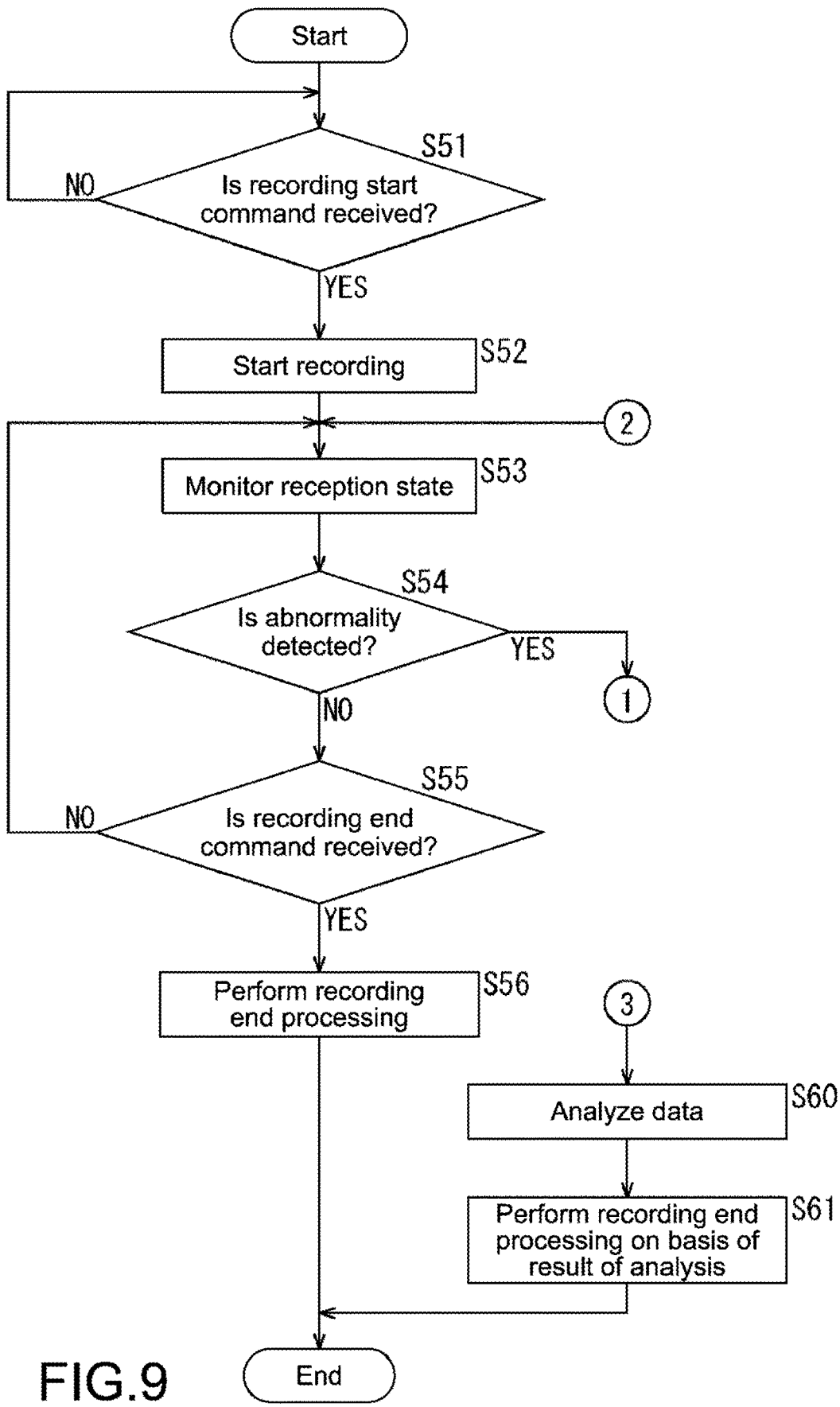
FIG. 9 is a flowchart for describing the data recording processing.

Note that the processing of Steps S51 to S56, S60, and S61 of the flowchart of FIG. 9 are similar to the processing of Steps S11 to S18 of the flowchart of FIG. 5, and hence descriptions thereof will be omitted.

Figure 10:
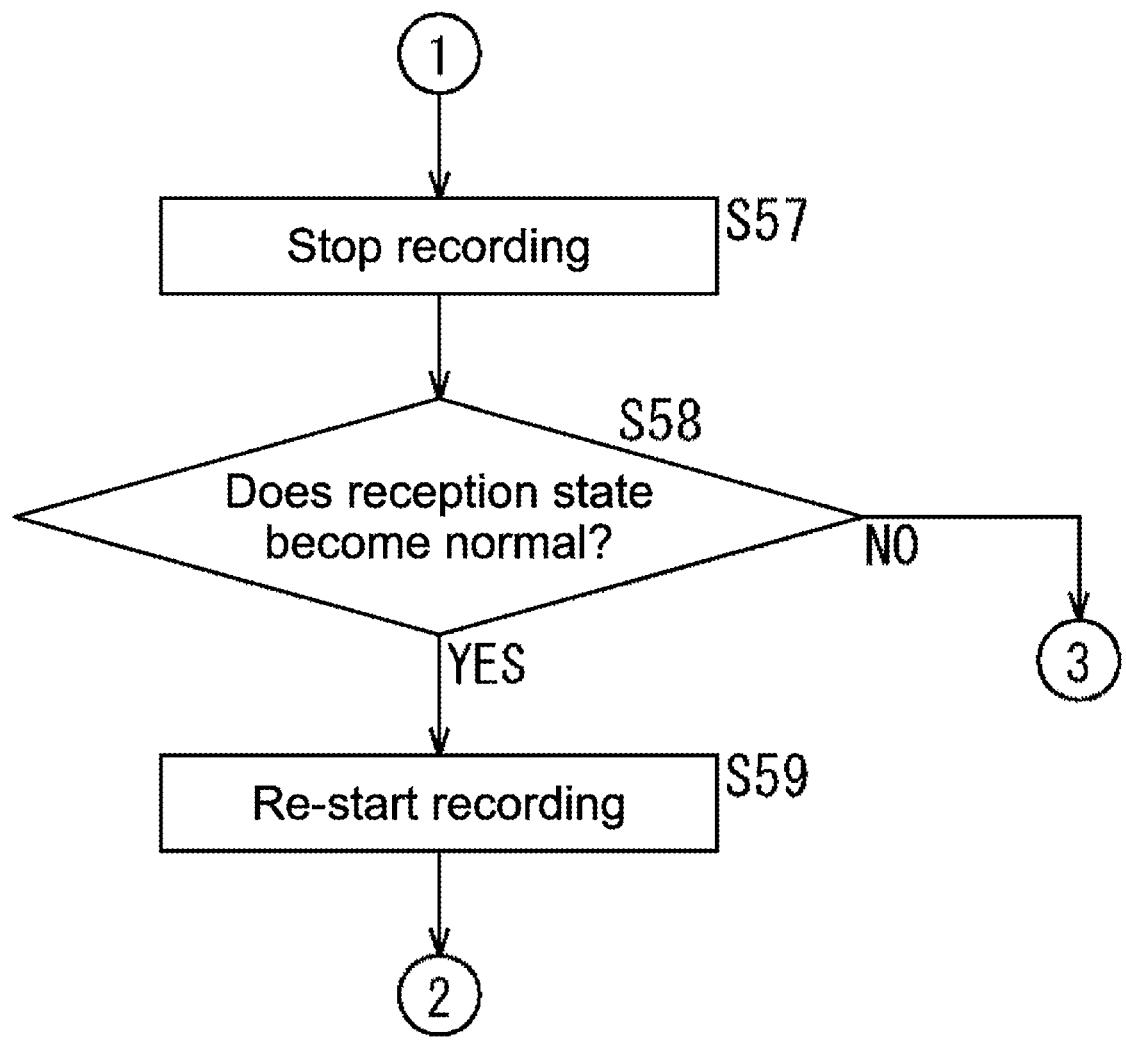
FIG. 10 is a flowchart for describing the data recording processing.

That is, if the state monitor 72 detects that the reception state of the moving-image data is abnormal in Step S54, the processing proceeds to Step S57 of FIG. 10.

In Step S57, the recording controller 73 temporarily stops the recording of the moving-image data.

The state in which the recording of the moving-image data is temporarily stopped is maintained for a predetermined period of time. After the predetermined time has elapsed, in Step S58, the state monitor 72 determines whether or not the reception state of the moving-image data becomes normal.

In Step S58, if the state monitor 72 determines that the reception state of the moving-image data becomes normal, for example, if the state of connection with the camera 11 via the network 13 is recovered and a continuation of the moving-image data is received from the camera 11, the processing proceeds to Step S59.

In Step S59, the recording controller 73 re-starts the recording of the moving-image data. After that, the processing returns to Step S53 of FIG. 9 and the subsequent processing is repeated.

On the other hand, if the state monitor 72 determines that the reception state of the moving-image data does not become normal in Step S58, the processing proceeds to Step S60 of FIG. 9, and the analysis and the recording end processing of the moving-image data are performed.

In accordance with the above-mentioned processing, it is possible to prevent the file of the moving-image data from being unintentionally divided when the recording can be normally performed again after any error occurs in recording.

4. Configuration of Recording System

Figure 11:
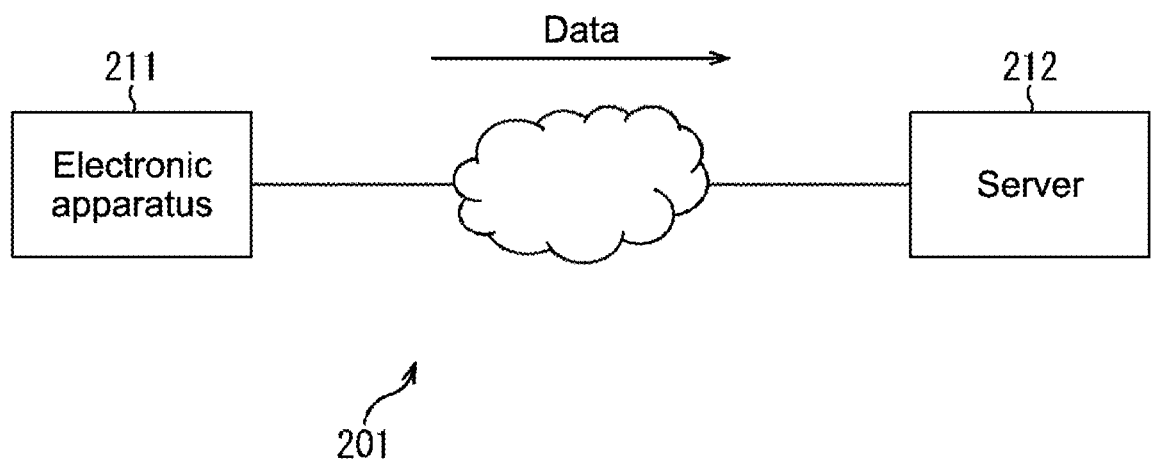
FIG. 11 is a diagram showing the outline of a recording system according to this embodiment.

Hereinabove, the examples in which the technology according to the present disclosure is applied to the camera system 1 have been described, though not limited thereto. The technology according to the present disclosure can be applied to a recording system as shown in FIG. 11.
(Outline of Recording System)

FIG. 11 is a diagram showing the outline of a recording system according to this embodiment.

In a recording system 201 of FIG. 11, an electronic apparatus 211 transmits data obtained by the electronic apparatus 211 itself to a server 212 in real time.

The server 212 receives the data transmitted from the electronic apparatus 211, and records the received data in real time.

The electronic apparatus 211 is not limited to an apparatus that obtains the moving-image data as shown in the camera 11 of FIG. 1. For example, the electronic apparatus 211 may obtain continuous data such as so-called time lapse data and recorded audio data. With the time-lapse data, a moving-image is represented by a sequence of continuous still images.

In such a configuration, the server 212 is provided with the controller 61 (FIG. 4). With this, if any error occurs in recording the data obtained from the electronic apparatus 211, the server 212 is capable of analyzing the data and performing the recording end processing on a basis of a result of analysis. Therefore, the already obtained data can be correctly recorded.

5. Application Example

The technology according to the present disclosure is applicable to various products. For example, the technology according to the present disclosure may be realized as a system including any type of mobile objects including an automobile, an electric vehicle, a hybrid electric vehicle, a motorcycle, a bicycle, a personal mobility, an airplane, a drone, a ship, a robot, a construction machine, an agricultural machine (tractor), and the like.

Figure 12:
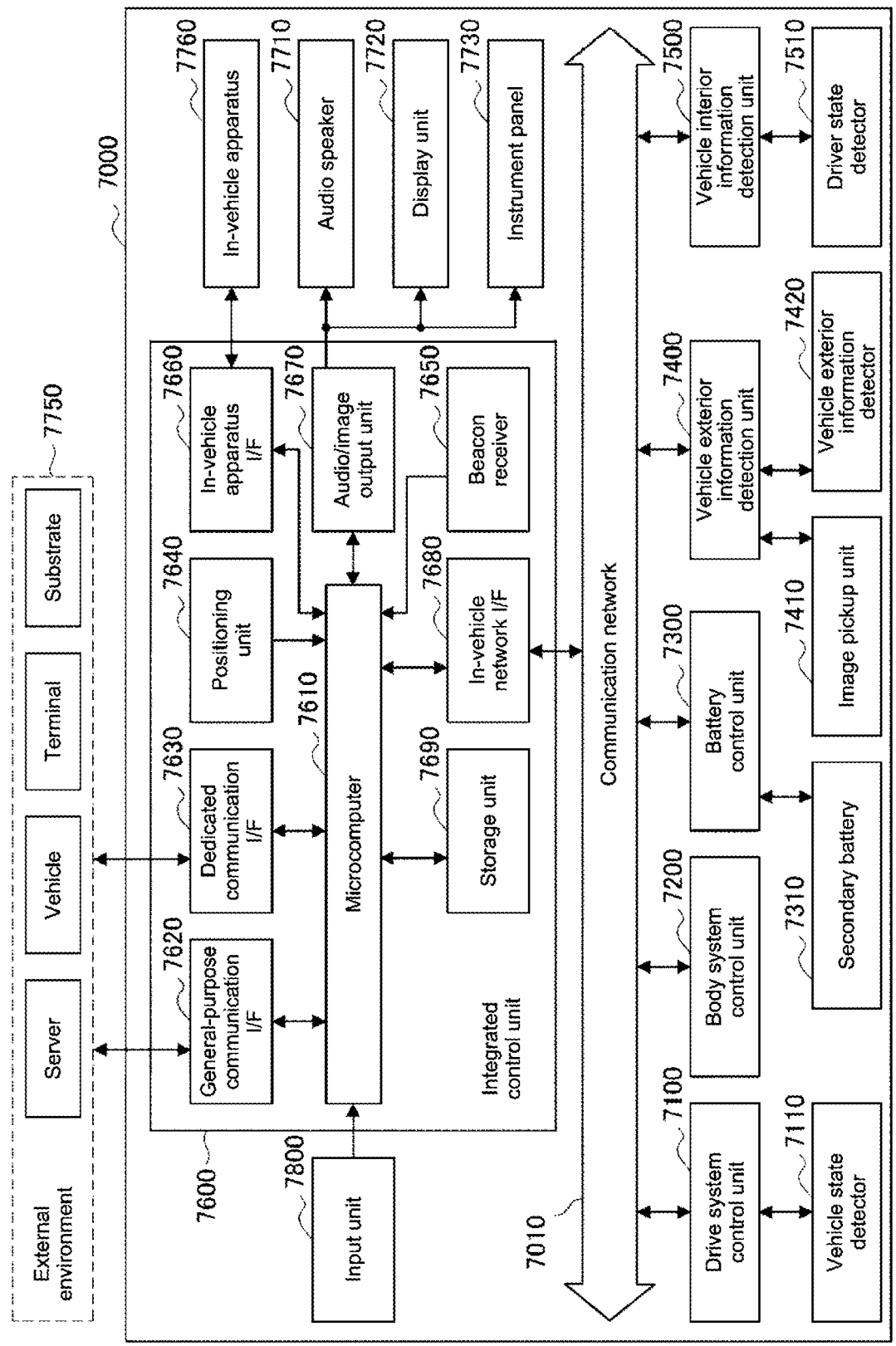
FIG. 12 is a block diagram showing a schematic configuration example of a vehicle control system.

FIG. 12 is a block diagram showing a schematic configuration example of a vehicle control system 7000 which is an example of a mobile object control system to which the technology according to the present disclosure can be applied. The vehicle control system 7000 includes a plurality of electronic control units connected via a communication network 7010. In the example shown in FIG. 12, the vehicle control system 7000 includes a drive system control unit 7100, a body system control unit 7200, a battery control unit 7300, an vehicle exterior information detection unit 7400, an vehicle interior information detection unit 7500, and an integrated control unit 7600. The communication network 7010 connecting these plurality of control units may be, for example, an in-vehicle communication network conforming to an arbitrary standard, such as a controller area network (CAN), a local interconnect network (LIN), a local area network (LAN), and FlexRay (registered trademark).

Each of the control units includes a microcomputer that carries out arithmetic processing in accordance with various programs, a storage unit that stores programs to be executed by the microcomputer, parameters to be used for various calculations, and the like, and a drive circuit that drives various control target apparatuses. Each of the control units includes a network I/F for communicating with another control unit via the communication network 7010 and also includes a communication I/F for communicating with apparatuses and sensors in- and outside the vehicle, and the like by wired communication or wireless communication. In FIG. 12, as a functional configuration of the integrated control unit 7600, a microcomputer 7610, a general-purpose communication I/F 7620, a dedicated communication I/F 7630, a positioning unit 7640, a beacon receiver 7650, an in-vehicle apparatus I/F 7660, an audio/image output unit 7670, an in-vehicle network I/F 7680, and a storage unit 7690 are illustrated. Other control units similarly include a microcomputer, a communication I/F, a storage unit, and the like.

The drive system control unit 7100 controls an operation of an apparatus related to a drive system of the vehicle in accordance with various programs. For example, the drive system control unit 7100 functions as a control apparatus for a drive force generation apparatus for generating a drive force of a vehicle, such as an internal combustion engine and a drive motor, a drive force transmission mechanism for transmitting a drive force to wheels, a steering mechanism that adjusts a steering angle of the vehicle, a brake apparatus for generating a brake force of the vehicle, and the like. The drive system control unit 7100 may also include a function as a control apparatus such as antilock brake system (ABS) and electronic stability control (ESC).

A vehicle state detector 7110 is connected to the drive system control unit 7100. For example, the vehicle state detector 7110 includes at least one of a gyro sensor for detecting an angular velocity of an axial rotation movement of a vehicle body, an acceleration sensor for detecting an acceleration of the vehicle, and sensors for detecting an operation amount of an accelerator pedal, an operation amount of a brake pedal, a steering angle of a steering wheel, an RPM of an engine, a rotation speed of the wheels, or the like. The drive system control unit 7100 carries out arithmetic processing using signals input from the vehicle state detector 7110 and controls the internal combustion engine, the drive motor, the electric power steering apparatus, the brake apparatus, and the like.

The body system control unit 7200 controls operations of various apparatuses mounted on the vehicle body in accordance with various programs. For example, the body system control unit 7200 functions as a control apparatus for a keyless entry system, a smart key system, a power window apparatus, or various lamps such as headlights, backlights, brake lights, indicators, and fog lamps. In this case, radio waves transmitted from a mobile device that substitutes for a key or signals of various switches can be input to the body system control unit 7200. The body system control unit 7200 receives the input of these radio waves or signals and controls a door lock apparatus, power window apparatus, lamps, and the like of the vehicle.

The battery control unit 7300 controls a secondary battery 7310 which is a power supply source of the drive motor in accordance with various programs. For example, to the battery control unit 7300, information on a battery temperature, a battery output voltage, a remaining battery capacity, and the like is input from a battery apparatus including the secondary battery 7310. The battery control unit 7300 carries out arithmetic processing using these signals and performs temperature adjustment control of the secondary battery 7310 and control of a cooling apparatus or the like provided in the battery apparatus.

The vehicle exterior information detection unit 7400 detects external information of the vehicle on which the vehicle control system 7000 is mounted. For example, at least one of an image pickup unit 7410 and an vehicle exterior information detector 7420 is connected to the vehicle exterior information detection unit 7400. The image pickup unit 7410 includes at least one of a time of flight (ToF) camera, a stereo camera, a monocular camera, an infrared camera, and other cameras. The vehicle exterior information detector 7420 includes, for example, at least one of an environmental sensor for detecting a current weather or climate and a peripheral information detection sensor for detecting other vehicles, obstacles, pedestrians, and the like in the periphery of the vehicle on which the vehicle control system 7000 is mounted.

The environmental sensor may be, for example, at least one of a raindrop sensor for detecting rain, a fog sensor for detecting a fog, a sunshine sensor for detecting a sunshine degree, and a snow sensor for detecting a snowfall. The peripheral information detection sensor may be at least one of an ultrasonic sensor, a radar apparatus, and a light detection and ranging, laser imaging detection and ranging (LIDAR) apparatus. The image pickup unit 7410 and the vehicle exterior information detector 7420 may respectively be provided as independent sensors or apparatuses, or may be provided as an apparatus in which a plurality of sensors or apparatuses are integrated.

Figure 13:
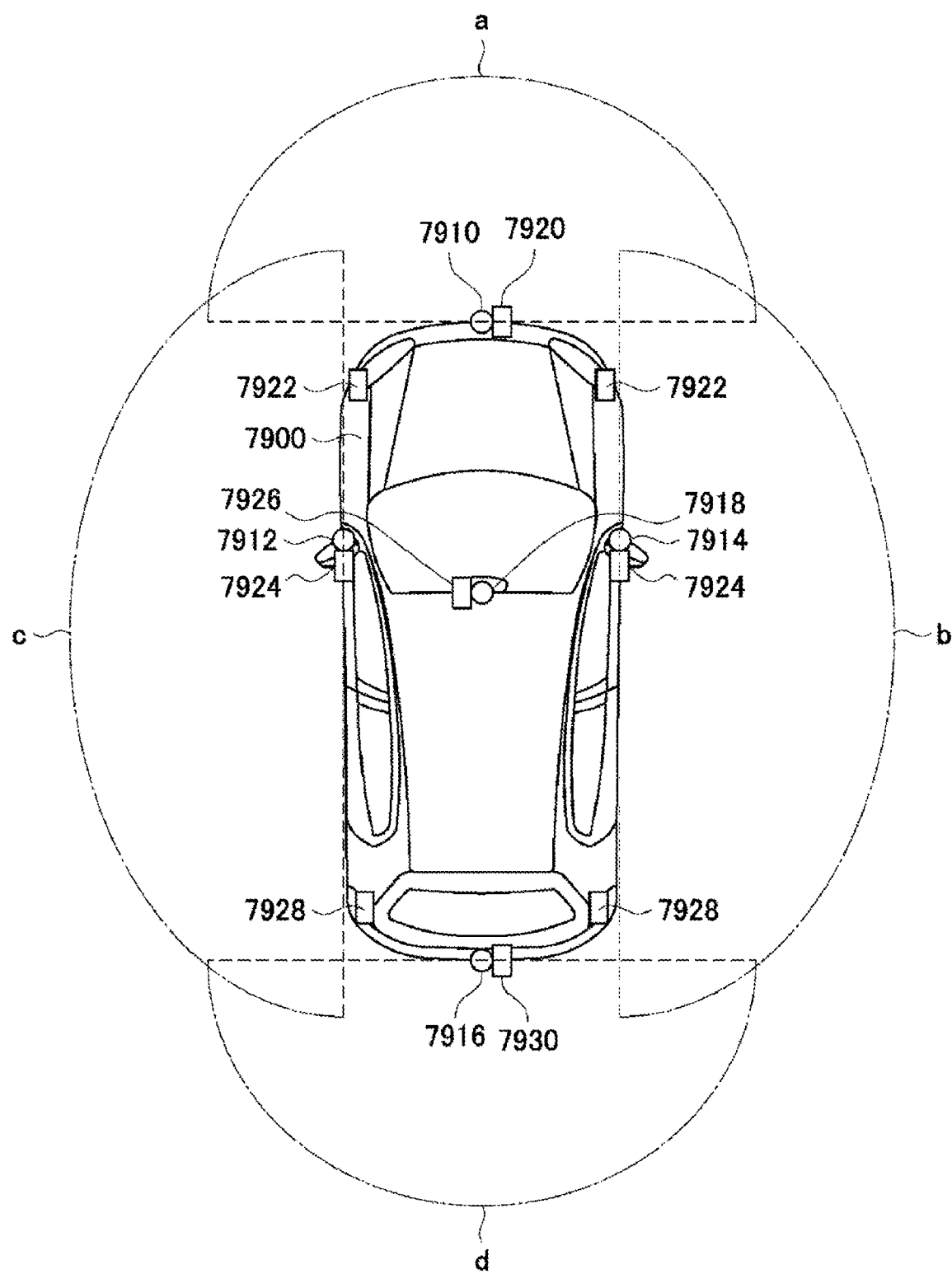
FIG. 13 is an explanatory diagram showing an example of setting positions of vehicle exterior information detector and an image pickup unit.

Here, FIG. 13 shows an example of setting positions of the image pickup unit 7410 and the vehicle exterior information detector 7420. Image pickup units 7910, 7912, 7914, 7916, and 7918 are positioned at, for example, at least one of a front nose, side mirrors, rear bumper, back door, and upper portion of a front windshield of a vehicle interior of a vehicle 7900. The image pickup unit 7910 provided at the front nose and the image pickup unit 7918 provided at the upper portion of the front windshield of the vehicle interior mainly obtain images in front of the vehicle 7900. The image pickup units 7912 and 7914 provided at the side mirrors mainly obtain side images of the vehicle 7900. The image pickup unit 7916 provided at the rear bumper or the back door mainly obtains an image behind the vehicle 7900. The image pickup unit 7918 provided at the upper portion of the front windshield of the vehicle interior is mainly used for detecting preceding vehicles, pedestrians, obstacles, traffic lights, traffic signs, lanes, and the like.

Note that FIG. 13 shows an example of image pickup ranges of the image pickup units 7910, 7912, 7914, and 7916, respectively. The image pickup range a indicates an image pickup range of the image pickup unit 7910 provided at the front nose, the image pickup ranges b and c respectively indicate image pickup ranges of the image pickup units 7912 and 7914 provided at the side mirrors, and the image pickup range d indicates an image pickup range of the image pickup unit 7916 provided at the rear bumper or the back door. For example, by superimposing image data captured by the image pickup units 7910, 7912, 7914, and 7916, an overhead view image of the vehicle 7900 viewed from above can be obtained.

Vehicle exterior information detectors 7920, 7922, 7924, 7926, 7928, 7930 provided at the front, rear, sides, corners, and upper portion of the front windshield of the vehicle interior of the vehicle 7900 may be ultrasonic sensors or radar apparatuses, for example. The vehicle exterior information detectors 7920, 7926, and 7930 provided at the front nose, rear bumper, back door, and upper portion of the front windshield of the vehicle interior of the vehicle 7900 may be, for example, LIDAR apparatuses. These vehicle exterior information detectors 7920 to 7930 are mainly used for detecting preceding vehicles, pedestrians, obstacles, and the like.

Returning to FIG. 12, the descriptions will be continued. The vehicle exterior information detection unit 7400 causes the image pickup unit 7410 to capture an image of an outside of the vehicle and receives captured image data. Further, the vehicle exterior information detection unit 7400 receives detection information from the connected vehicle exterior information detector 7420. In a case where the vehicle exterior information detector 7420 is an ultrasonic sensor, a radar apparatus, or a LIDAR apparatus, the vehicle exterior information detection unit 7400 transmits ultrasonic waves, electromagnetic waves, or the like and receives information of the received reflected waves. The vehicle exterior information detection unit 7400 may carry out object detection processing or distance detection processing of a person, car, obstacle, sign, characters on a road surface, and the like, on a basis of the received information. The vehicle exterior information detection unit 7400 may also carry out environment recognition processing for recognizing a rainfall, fog, road surface condition, and the like on a basis of the received information. The vehicle exterior information detection unit 7400 may also calculate a distance to an object outside the vehicle on a basis of the received information.

Furthermore, the vehicle exterior information detection unit 7400 may also carry out image recognition processing for recognizing a person, car, obstacle, sign, characters on a road surface, and the like or distance detection processing on a basis of the received image data. The vehicle exterior information detection unit 7400 may also carry out processing of a distortion correction, positioning, or the like on the received image data, and synthesize the image data captured by the different image pickup units 7410 to generate an overhead view image or panorama image. The vehicle exterior information detection unit 7400 may also carry out viewpoint conversion processing using image data captured by the different image capturing units 7410.

The vehicle interior information detection unit 7500 detects vehicle interior information. Connected to the vehicle interior information detection unit 7500 is, for example, a driver state detector 7510 that detects a state of a driver. The driver state detector 7510 may include a camera for capturing the driver, a biological sensor for detecting biological information of the driver, a microphone for collecting audio in the vehicle interior, and the like. The biological sensor is provided in, for example, a seat, a steering wheel, or the like, and detects biological information of a passenger sitting on the seat or the driver holding the steering wheel. The vehicle interior information detection unit 7500 may calculate a degree of fatigue or a degree of concentration of the driver or judge whether the driver is falling asleep on a basis of the detection information input from the driver state detector 7510. The vehicle interior information detection unit 7500 may also carry out noise canceling processing on collected audio signals, and the like.

The integrated control unit 7600 controls overall operations of the vehicle control system 7000 in accordance with various programs. An input unit 7800 is connected to the integrated control unit 7600. The input unit 7800 is realized by an apparatus to which a passenger can perform an input operation, such as a touch panel, a button, a microphone, a switch, and a lever. Data obtained by carrying out audio recognition on audio input via the microphone may be input to the integrated control unit 7600. The input unit 7800 may be, for example, a remote control apparatus that uses infrared rays or other radio waves, or an externally-connected apparatus such as a cellular phone and a personal digital assistant (PDA) that correspond to operations of the vehicle control system 7000. The input unit 7800 may be, for example, a camera, and in this case, the passenger can input information by gestures. Alternatively, data obtained by detecting a movement of a wearable apparatus worn by the passenger may be input. Further, the input unit 7800 may include, for example, an input control circuit that generates an input signal on a basis of information input by the passenger or the like using the input unit 7800 described above and outputs the input signal to the integrated control unit 7600, or the like. By operating this input unit 7800, the passenger or the like inputs various types of data or instructs a processing operation with respect to the vehicle control system 7000.

The storage unit 7690 may include a read only memory (ROM) that stores various programs to be executed by the microcomputer and a random access memory (RAM) that stores various parameters, calculation results, sensor values, and the like. Further, the storage unit 7690 may be realized by a magnetic storage device such as a hard disk drive (HDD), a semiconductor storage device, an optical storage device, a magneto-optical storage device, or the like.

The general-purpose communication I/F 7620 is a general-purpose communication I/F that mediates communication among various apparatuses existing in an external environment 7750. In the general-purpose communication I/F 7620, a cellular communication protocol such as global system of mobile communications (GSM(registered trademark)), WiMAX (registered trademark), long term evolution (LTE (registered trademark)), and LTE-advanced (LTE-A) or other wireless communication protocols such as a wireless LAN (also referred to as Wi-Fi (registered trademark)) and Bluetooth (registered trademark) may be implemented. The general-purpose communication I/F 7620 may be connected to an apparatus (e.g., application server or control server) existing in an external network (e.g., Internet, cloud network, or network unique to business operator) via a base station or an access point, for example. Further, the general-purpose communication I/F 7620 may use, for example, a peer to peer (P2P) technology to be connected with a terminal existing in the vicinity of the vehicle (e.g., terminal of driver, pedestrian or shop, or machine type communication (MTC) terminal).

The dedicated communication I/F 7630 is a communication I/F that supports a communication protocol formulated for use in a vehicle. For example, in the dedicated communication I/F 7630, wireless access in vehicle environment (WAVE) as a combination of lower-layer IEEE 802.11p and upper-layer IEEE 1609, dedicated short range communications (DSRC), or a standard protocol such as a cellular communication protocol can be implemented. Typically, the dedicated communication I/F 7630 executes V2X communication as a general idea including one or more of vehicle to vehicle communication, vehicle to infrastructure communication, vehicle to home communication, and vehicle to pedestrian communication.

The positioning unit 7640 receives a GNSS signal (e.g., GPS signal from global positioning system (GPS) satellite) from a global navigation satellite system (GNSS) satellite to execute positioning, for example, and generates positional information including a latitude, longitude, and altitude of the vehicle. Note that the positioning unit 7640 may specify a current position by transmitting and receiving signals to/from a wireless access point, or may obtain positional information from a terminal such as a cellular phone, a PHS, and a smartphone including a positioning function.

The beacon receiver 7650 receives radio waves or electromagnetic waves transmitted from a radio station or the like set on a road, for example, and obtains information on the current position, traffic jam, road closure, necessary time, and the like. Note that the function of the beacon receiver 7650 may be included in the dedicated communication I/F 7630 described above.

The in-vehicle apparatus I/F 7660 is a communication interface that mediates connections between the microcomputer 7610 and various in-vehicle apparatuses 7760 existing in the vehicle. The in-vehicle apparatus I/F 7660 may establish a wireless connection using a wireless communication protocol such as wireless LAN, Bluetooth (registered trademark), near field communication (NFC), and wireless USB (WUSB). Further, the in-vehicle apparatus I/F 7660 may establish a wired connection using a universal serial bus (USB), high-definition multimedia interface (HDMI (registered trademark)), and mobile high-definition link (MHL) via a connection terminal (not shown) (and cable if necessary). An in-vehicle apparatus 7760 may include, for example, at least one of a mobile apparatus or a wearable apparatus possessed by the passenger, and an information apparatus carried into or attached to the vehicle. Furthermore, the in-vehicle apparatus 7760 may include a navigation apparatus that performs a route search to an arbitrary destination. The in-vehicle apparatus I/F 7660 transmits and receives control signals or data signals to/from these in-vehicle apparatuses 7760.

The in-vehicle network I/F 7680 is an interface that mediates communication between the microcomputer 7610 and the communication network 7010. The in-vehicle network I/F 7680 transmits and receives signals and the like in accordance with a predetermined protocol supported by the communication network 7010.

The microcomputer 7610 of the integrated control unit 7600 controls the vehicle control system 7000 in accordance with various programs on a basis of information obtained via at least one of the general-purpose communication I/F 7620, the dedicated communication I/F 7630, the positioning unit 7640, the beacon receiver 7650, the in-vehicle apparatus I/F 7660, and the in-vehicle network I/F 7680. For example, the microcomputer 7610 may calculate a control target value of the drive force generation apparatus, the steering mechanism, or the brake apparatus on a basis of obtained information on the inside and outside of the vehicle, and output a control command to the drive system control unit 7100. For example, the microcomputer 7610 may perform cooperative control that aims at realizing a function of advanced driver assistance system (ADAS) that includes collision avoidance or impact mitigation of the vehicle, follow-up traveling based on an inter-vehicle distance, vehicle-speed maintenance traveling, vehicle collision warning, lane deviation warning of the vehicle, and the like. Further, the microcomputer 7610 may control the drive force generation apparatus, the steering mechanism, the brake apparatus, or the like on a basis of obtained peripheral information of the vehicle, to thus perform cooperative control that aims at realizing automated drive in which a vehicle runs autonomously without depending on operations of a driver, and the like.

The microcomputer 7610 may generate three-dimensional distance information between the vehicle and objects such as peripheral structures and people on a basis of information obtained via at least one of the general-purpose communication I/F 7620, the dedicated communication I/F 7630, the positioning unit 7640, the beacon receiver 7650, the in-vehicle apparatus I/F 7660, and the in-vehicle network I/F 7680, and create local map information including peripheral information regarding the current position of the vehicle. Further, the microcomputer 7610 may predict a danger such as a collision of a vehicle, approach of a pedestrian or the like, and entry into a closed road on a basis of the obtained information, and generate a warning signal. The warning signal may be, for example, a signal for generating a warning sound or a signal for turning on a warning lamp.

The audio/image output unit 7670 transmits an output signal of at least one of audio and an image to an output apparatus capable of visually or auditorily notifying the passenger of the vehicle or the outside of the vehicle of the information. In the example shown in FIG. 12, an audio speaker 7710, a display unit 7720, and an instrument panel 7730 are exemplified as the output apparatus. The display unit 7720 may include at least one of an on-board display and a head-up display, for example. The display unit 7720 may include an augmented reality (AR) display function. Other than these apparatuses, the output apparatus may be a wearable device such as a headphone and a glasses-type display worn by the passenger, or other apparatuses such as a projector and a lamp. In a case where the output apparatus is a display apparatus, the display apparatus visually displays results obtained by the various types of processing carried out by the microcomputer 7610 or information received from other control units in various forms such as a text, an image, a table, and a graph. In a case where the output apparatus is an audio output apparatus, the audio output apparatus converts audio signals constituted of reproduced audio data, acoustic data, or the like into analog signals, and auditorily outputs the signals.

Note that, in the example shown in FIG. 12, at least two control units connected via the communication network 7010 may be integrated as one control unit. Alternatively, each of the control units may be constituted of a plurality of control units. In addition, the vehicle control system 7000 may include another control unit not shown. Further, in the descriptions above, a part or all of the functions provided to any of the control units may be given to another control unit. In other words, as long as information can be transmitted and received via the communication network 7010, predetermined arithmetic processing may be carried out by any control unit. Similarly, a sensor or apparatus connected to any one of the control units may be connected to another control unit, and the plurality of control units may transmit and receive detection information to/from each another via the communication network 7010.

The server 212 according to this embodiment, which has been described with reference to FIG. 11, can be applied to a server that communicates with the general-purpose communication I/F 7620 in the application example shown in FIG. 12 and located in the external environment 7750.

For example, the server located in the external environment 7750 analyzes the data and performs the recording end processing on a basis of a result of analysis if any error occurs in that server and an abnormality is detected while that server is recording the moving-image data obtained from the vehicle 7900.

Further, the server located in the external environment 7750 may analyze the data and perform the recording end processing on a basis of a result of analysis if the vehicle 7900 moves out of the communication range, for example, if the vehicle 7900 travels in a tunnel while that server is recording the moving-image data obtained from the vehicle 7900.

In addition, the server located in the external environment 7750 may analyze the data and perform the recording end processing on a basis of a result of analysis if any error occurs in the image pickup unit 7410 that obtains the moving-image data, rather than an abnormality of the vehicle 7900 itself, while that server is recording the moving-image data obtained from the vehicle 7900.

With this, the already obtained moving-image data can be correctly recorded if it is detected that the reception state of the data is abnormal due to an accident of the vehicle, a change in travelling environment, a failure of an in-vehicle camera, or the like. Therefore, the cause of the accident can be easily analyzed.

It should be noted that the embodiments of the present technology are not limited to the above-mentioned embodiments, and various modifications can be made without departing from the gist of the present technology.

In addition, the present technology can also take the following configurations.

(1)

A server comprising:
a recording unit; and
a controller configured to
  receive image data of a subject from a camera,
  control the recording unit to record the image data of the subject that is received from the camera,
  monitor the image data of the subject to determine whether the image data of the subject that is received from the camera is abnormal, and
  responsive to determining that the image data of the subject that is received from the camera is abnormal, control the recording unit to perform recording end processing on the image data of the subject that has already been recorded.

(2)

The server as stated in paragraph (1) above, wherein, to monitor the image data of the subject to determine whether the image data of the subject that is received from the camera is abnormal, the controller is further configured to
  detect whether the image data of the subject is received within a predetermined period of time, and
  determine that the image data of the subject is abnormal when the image data of the subject is not received within the predetermined period of time.

(3)

The server as stated in paragraphs (1) to (2) above, wherein the controller is further configured to receive information indicative of an operation state of the camera, and wherein, to monitor the image data of the subject to determine whether the image data of the subject that is received from the camera is abnormal, the controller is further configured to
    determine whether the information indicative of the operation state of the camera is indicative of a recording operation by the camera, and
    determine that the image data of the subject is abnormal when the information indicative of the operation state of the camera is not indicative of the recording operation by the camera.

(4)
The server as stated in paragraphs (1) to (3) above, wherein the controller is further configured to receive error information from the camera, and
    wherein, to monitor the image data of the subject to determine whether the image data of the subject that is received from the camera is abnormal, the controller is further configured to determine that the image data of the subject is abnormal when the error information is received from the camera.

(5)
The server as stated in paragraphs (1) to (4) above, wherein the controller is configured to receive the image data of the subject from the camera via a network, and
    wherein, to monitor the image data of the subject to determine whether the image data of the subject that is received from the camera is abnormal, the controller is further configured to
    detect a connection state between the camera and the network, and
    determine that the image data of the subject is abnormal based on the connection state that is detected.

(6)
The server as stated in paragraphs (1) to (5) above, wherein the recording end processing includes inserting footer information to a footer portion of the image data, the footer information including a reproducible format of the image data.

(7)
A method comprising:
    receiving, with a controller of a server, image data of a subject from a camera;
    controlling, with the controller, a recording unit to record the image data of the subject that is received from the camera;
    monitoring, with the controller, the image data of the subject to determine whether the image data of the subject that is received from the camera is abnormal; and
    controlling, with the controller, the recording unit to perform recording end processing on the image data of the subject that has already been recorded in response to determining that the image data of the subject that is received from the camera is abnormal.

(8)
The method as stated in paragraph (7) above, wherein monitoring the image data of the subject to determine whether the image data of the subject that is received from the camera is abnormal further includes
    detecting whether the image data of the subject is received within a predetermined period of time, and
    determining that the image data of the subject is abnormal when the image data of the subject is not received within the predetermined period of time.

(9)
The method as stated in paragraphs (7) to (8) above, further comprising receiving information indicative of an operation state of the camera,
    wherein monitoring the image data of the subject to determine whether the image data of the subject that is received from the camera is abnormal further includes
    determining whether the information indicative of the operation state of the camera is indicative of a recording operation by the camera, and
    determining that the image data of the subject is abnormal when the information indicative of the operation state of the camera is not indicative of the recording operation by the camera.

(10)
The method as stated in paragraphs (7) to (9) above, further comprising receiving error information from the camera,
    wherein monitoring the image data of the subject to determine whether the image data of the subject that is received from the camera is abnormal further includes
    determining that the image data of the subject is abnormal when the error information is received from the camera.

(11)
The method as stated in paragraphs (7) to (10) above, further comprising receiving the image data of the subject from the camera via a network,
    wherein monitoring the image data of the subject to determine whether the image data of the subject that is received from the camera is abnormal further includes
    detecting a connection state between the camera and the network, and
    determining that the image data of the subject is abnormal based on the connection state that is detected.

(12)
The method as stated in paragraphs (7) to (11) above, wherein the recording end processing includes inserting footer information to a footer portion of the image data, the footer information including a reproducible format of the image data.

(13)
A non-transitory computer-readable medium comprising instructions that, when executed by an electronic processor of a server, cause the electronic processor to perform a set of operations comprising:
    receiving image data of a subject from a camera;
    controlling a recording unit to record the image data of the subject that is received from the camera;
    monitoring the image data of the subject to determine whether the image data of the subject that is received from the camera is abnormal; and
    controlling the recording unit to perform recording end processing on the image data of the subject that has already been recorded in response to determining that the image data of the subject that is received from the camera is abnormal.

(14)
The non-transitory computer-readable medium as stated in paragraph (13) above, wherein monitoring the image data of the subject to determine whether the image data of the subject that is received from the camera is abnormal further includes
    detecting whether the image data of the subject is received within a predetermined period of time, and
    determining that the image data of the subject is abnormal when the image data of the subject is not received within the predetermined period of time.

(15)

The non-transitory computer-readable medium as stated in paragraphs (13) to (14) above, the set of operations further comprising:

receiving information indicative of an operation state of the camera, wherein monitoring the image data of the subject to determine whether the image data of the subject that is received from the camera is abnormal further includes determining whether the information indicative of the operation state of the camera is indicative of a recording operation by the camera, and determining that the image data of the subject is abnormal when the information indicative of the operation state of the camera is not indicative of the recording operation by the camera.

(16)

The non-transitory computer-readable medium as stated in paragraphs (13) to (15) above, the set of operations further comprising:

receiving error information from the camera, wherein monitoring the image data of the subject to determine whether the image data of the subject that is received from the camera is abnormal further includes determining that the image data of the subject is abnormal when the error information is received from the camera.

(17)

The non-transitory computer-readable medium as stated in paragraphs (13) to (16) above, the set of operations further comprising:

receiving the image data of the subject from the camera via a network, wherein monitoring the image data of the subject to determine whether the image data of the subject that is received from the camera is abnormal further includes detecting a connection state between the camera and the network, and determining that the image data of the subject is abnormal based on the connection state that is detected.

(18)

The non-transitory computer-readable medium as stated in paragraphs (13) to (17) above, wherein the recording end processing includes inserting footer information to a footer portion of the image data, the footer information including a reproducible format of the image data.

(19)

A system comprising:

a camera configured to generate image data of a subject; and a server including a recording unit; and a controller configured to receive the image data of the subject from the camera, control the recording unit to record the image data of the subject that is received from the camera, monitor the image data of the subject to determine whether the image data of the subject that is received from the camera is abnormal, and responsive to determining that the image data of the subject that is received from the camera is abnormal, control the recording unit to perform recording end processing on the image data of the subject that has already been recorded.

(20)

The system as stated in paragraph (19) above, further comprising:

a vehicle including a vehicle control system, the vehicle control system including the camera.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Camera system
11 Camera
12 Server
13 Network
51 Controller
52 Image pickup unit
53 Encoder
54 Communication unit
61 Controller
62 Communication unit
63 Recording unit
71 Communication controller
72 State monitor
73 Recording controller
74 Analyzer
211 Electronic apparatus
212 Server

The invention claimed is:

1. A server comprising:

a recording unit; and a controller configured to receive image data of a subject from a camera, control the recording unit to record the image data of the subject that is received from the camera, monitor the image data of the subject to determine whether the image data of the subject that is received from the camera is abnormal, responsive to determining that the image data of the subject that is received from the camera is abnormal, control the recording unit to perform recording end processing on the image data of the subject that has already been recorded, and receive error information from the camera, wherein, to monitor the image data of the subject to determine whether the image data of the subject that is received from the camera is abnormal, the controller is further configured to determine that the image data of the subject is abnormal when the error information is received from the camera.

2. The server according to claim 1, wherein, to monitor the image data of the subject to determine whether the image data of the subject that is received from the camera is abnormal, the controller is further configured to detect whether the image data of the subject is received within a predetermined period of time, and determine that the image data of the subject is abnormal when the image data of the subject is not received within the predetermined period of time.

3. The server according to claim 1, wherein the controller is further configured to receive information indicative of an operation state of the camera, and wherein, to monitor the image data of the subject to determine whether the image data of the subject that is received from the camera is abnormal, the controller is further configured to determine whether the information indicative of the operation state of the camera is indicative of a recording operation by the camera, and determine that the image data of the subject is abnormal when the information indicative of the operation state of the camera is not indicative of the recording operation by the camera.

4. The server according to claim 1, wherein the error information from the camera indicates an abnormality in the camera.

5. The server according to claim 1, wherein the controller is configured to receive the image data of the subject from the camera via a network, and wherein, to monitor the image data of the subject to determine whether the image data of the subject that is received from the camera is abnormal, the controller is further configured to detect a connection state between the camera and the network, and determine that the image data of the subject is abnormal based on the connection state that is detected.

6. The server according to claim 1, wherein the recording end processing includes inserting footer information to a footer portion of the image data, the footer information including a reproducible format of the image data.

7. A method comprising:

receiving, with a controller of a server, image data of a subject from a camera;

controlling, with the controller, a recording unit to record the image data of the subject that is received from the camera;

monitoring, with the controller, the image data of the subject to determine whether the image data of the subject that is received from the camera is abnormal;

controlling, with the controller, the recording unit to perform recording end processing on the image data of the subject that has already been recorded in response to determining that the image data of the subject that is received from the camera is abnormal; and receiving error information from the camera, wherein monitoring the image data of the subject to determine whether the image data of the subject that is received from the camera is abnormal further includes determining that the image data of the subject is abnormal when the error information is received from the camera.

8. The method according to claim 7, wherein monitoring the image data of the subject to determine whether the image data of the subject that is received from the camera is abnormal further includes detecting whether the image data of the subject is received within a predetermined period of time, and determining that the image data of the subject is abnormal when the image data of the subject is not received within the predetermined period of time.

9. The method according to claim 7, further comprising receiving information indicative of an operation state of the camera, wherein monitoring the image data of the subject to determine whether the image data of the subject that is received from the camera is abnormal further includes determining whether the information indicative of the operation state of the camera is indicative of a recording operation by the camera, and determining that the image data of the subject is abnormal when the information indicative of the operation state of the camera is not indicative of the recording operation by the camera.

10. The method according to claim 7, wherein the error information from the camera indicates an abnormality in the camera.

11. The method according to claim 7, further comprising receiving the image data of the subject from the camera via a network, wherein monitoring the image data of the subject to determine whether the image data of the subject that is received from the camera is abnormal further includes detecting a connection state between the camera and the network, and determining that the image data of the subject is abnormal based on the connection state that is detected.

12. The method according to claim 7, wherein the recording end processing includes inserting footer information to a footer portion of the image data, the footer information including a reproducible format of the image data.

13. A non-transitory computer-readable medium comprising instructions that, when executed by an electronic processor of a server, cause the electronic processor to perform a set of operations comprising:

receiving image data of a subject from a camera;

controlling a recording unit to record the image data of the subject that is received from the camera;

monitoring the image data of the subject to determine whether the image data of the subject that is received from the camera is abnormal;

controlling the recording unit to perform recording end processing on the image data of the subject that has already been recorded in response to determining that the image data of the subject that is received from the camera is abnormal; and receiving error information from the camera, wherein monitoring the image data of the subject to determine whether the image data of the subject that is received from the camera is abnormal further includes determining that the image data of the subject is abnormal when the error information is received from the camera.

14. The non-transitory computer-readable medium according to claim 13, wherein monitoring the image data of the subject to determine whether the image data of the subject that is received from the camera is abnormal further includes detecting whether the image data of the subject is received within a predetermined period of time, and determining that the image data of the subject is abnormal when the image data of the subject is not received within the predetermined period of time.

15. The non-transitory computer-readable medium according to claim 13, the set of operations further comprising:

receiving information indicative of an operation state of the camera, wherein monitoring the image data of the subject to determine whether the image data of the subject that is received from the camera is abnormal further includes determining whether the information indicative of the operation state of the camera is indicative of a recording operation by the camera, and determining that the image data of the subject is abnormal when the information indicative of the operation state of the camera is not indicative of the recording operation by the camera.

16. The non-transitory computer-readable medium according to claim 13, wherein the error information from the camera indicates an abnormality in the camera.

17. The non-transitory computer-readable medium according to claim 13, the set of operations further comprising:

receiving the image data of the subject from the camera via a network, wherein monitoring the image data of the subject to determine whether the image data of the subject that is received from the camera is abnormal further includes detecting a connection state between the camera and the network, and determining that the image data of the subject is abnormal based on the connection state that is detected.

18. The non-transitory computer-readable medium according to claim 13, wherein the recording end processing includes inserting footer information to a footer portion of the image data, the footer information including a reproducible format of the image data.

19. A system comprising:
a camera configured to generate image data of a subject; and
a server including
   a recording unit; and
   a controller configured to
      receive the image data of the subject from the camera,
      control the recording unit to record the image data of the subject that is received from the camera,
      monitor the image data of the subject to determine whether the image data of the subject that is received from the camera is abnormal,
      responsive to determining that the image data of the subject that is received from the camera is abnormal, control the recording unit to perform recording end processing on the image data of the subject that has already been recorded, and
      receive error information from the camera,
   wherein, to monitor the image data of the subject to determine whether the image data of the subject that is received from the camera is abnormal, the controller is further configured to determine that the image data of the subject is abnormal when the error information is received from the camera.

20. The system according to claim 19, further comprising:
a vehicle including a vehicle control system, the vehicle control system including the camera.

* * * * *